United States Patent
Jones et al.

(10) Patent No.: US 10,929,149 B2
(45) Date of Patent: Feb. 23, 2021

(54) METHOD AND SYSTEM FOR UPDATING FIRMWARE

(71) Applicant: Red Hat, Inc., Raleigh, NC (US)

(72) Inventors: Peter Jones, Cambridge, MA (US); Adam Jackson, Somerville, MA (US)

(73) Assignee: RED HAT, INC., Raleigh, NC (US)

(*) Notice: Subject to any disclaimer, the term of this patent is extended or adjusted under 35 U.S.C. 154(b) by 729 days.

(21) Appl. No.: 14/538,633

(22) Filed: Nov. 11, 2014

(65) Prior Publication Data

US 2016/0132322 A1    May 12, 2016

(51) Int. Cl.
    G06F 9/445    (2018.01)
    G06F 8/654    (2018.01)
    G06F 8/54     (2018.01)

(52) U.S. Cl.
    CPC ............. *G06F 9/445* (2013.01); *G06F 8/654* (2018.02); *G06F 8/54* (2013.01)

(58) Field of Classification Search
    CPC ...................................................... G06F 8/665
    USPC ............................................................ 717/168
    See application file for complete search history.

(56) References Cited

U.S. PATENT DOCUMENTS

| | | | |
|---|---|---|---|
| 7,162,626 B2 | 1/2007 | Zimmer et al. | |
| 7,991,785 B1 | 8/2011 | Yakovlev | |
| 8,219,791 B2 | 7/2012 | Harmer et al. | |
| 8,312,509 B2 | 11/2012 | Zimmer et al. | |
| 8,356,168 B2 | 1/2013 | Zimmer et al. | |
| 8,484,631 B2 | 7/2013 | Mortensen | |
| 2005/0240941 A1* | 10/2005 | Hufferd | G06F 9/545 719/321 |
| 2007/0234350 A1* | 10/2007 | Wang | G06F 9/4411 717/174 |
| 2009/0063835 A1* | 3/2009 | Yao | G06F 12/1491 713/2 |
| 2009/0064125 A1* | 3/2009 | Venkatachalam | G06F 8/65 717/170 |
| 2009/0070630 A1* | 3/2009 | Khatri | G06F 11/073 714/37 |

(Continued)

OTHER PUBLICATIONS

Mona Vij, John Keys, Arun Raghunath, Scott Hahn, Vincent Zimmer, Leonid Ryzhyk, Adam Walker, Alexander Legg, Device Driver Synthesis, 2013, 22 pages, retrieved from http://www.researchgate.net/publication/259106092_Device_Driver_Synthesis/file/72e7e529ff716b6c35.pdf on Nov. 12, 2014.

(Continued)

*Primary Examiner* — Chat C Do
*Assistant Examiner* — Bradford F Wheaton
(74) *Attorney, Agent, or Firm* — Haynes and Boone, LLP (57) ABSTRACT

An example method of updating firmware includes receiving a memory map of a memory. The method also includes determining, based on the memory map, a set of memory regions storing a bundle of drivers in the memory, the bundle of drivers residing in firmware and being in an executable format. The method further includes for one or more drivers in the bundle of drivers (i) building, based on the memory map, a header that describes the respective driver, and (ii) creating an object file including the header and the respective driver, where the object file is in the executable format. The method also includes storing one or more of the object files in non-volatile memory.

17 Claims, 6 Drawing Sheets

(56) References Cited

U.S. PATENT DOCUMENTS

| | | | | |
|---|---|---|---|---|
| 2009/0177806 A1* | 7/2009 | Nishikawa | ............... | G06F 8/65 |
| | | | | 710/10 |
| 2012/0110562 A1* | 5/2012 | Heinrich | .................. | G06F 8/65 |
| | | | | 717/169 |
| 2013/0124843 A1 | 5/2013 | Bobzin | | |
| 2013/0326479 A1* | 12/2013 | Russell | .................... | G06F 8/70 |
| | | | | 717/121 |

OTHER PUBLICATIONS

UEFI Driver Development Guide for USB Devices, Nov. 2011, 12 pages, retrieved from http://www.intel.com/content/dam/www/public/us/en/documents/guides/uefi-driver-usb-devices-guide.pdfhttp://semanco-project.eu/index_htm_files/ELITE.pdf on Nov. 12, 2014.
Yuriy Bulygin, Andrew Furtak, Oleksandr Bazhaniuk, A Tale of One Software Bypass of Windows 8 Secure Boot, 2013, 87 pages, retrieved from http://iopscience.iop.org/1742-6596/396/3/032042/pdf/1742-6596_396_3_032042.pdf http://media.blackhat.com/us-13/us-13-Bulygin-A-Tale-of-One-Software-Bypass-of-Windows-8-Secure-Boot-Slides.pdf on Nov. 12, 2014.

* cited by examiner

METHOD AND SYSTEM FOR UPDATING FIRMWARE

FIELD OF DISCLOSURE

The present disclosure generally relates to firmware, and more specifically to updating firmware.

BACKGROUND

Typically, when firmware vendors provide firmware updates, the update is specific to a bug that is being reported by customers. Firmware vendors may not be motivated to provide firmware updates with new features. For example, firmware vendors typically do not see a marketing need for providing these new features in products. Accordingly, if a user desires a new feature or a newer version of a feature, the user may have problems with obtaining the new feature or new version in existing products.

BRIEF SUMMARY

Methods, systems, and techniques for updating firmware are provided.

According to some embodiments, a method of updating firmware includes receiving a memory map of a memory. The memory is coupled to a computing device and stores a bundle of drivers. The method also includes determining, based on the memory map, a set of memory regions storing a bundle of drivers in the memory. The bundle of drivers resides in firmware and is in an executable format. The method further includes for one or more drivers in the bundle of drivers (i) building, based on the memory map, a header that describes the respective driver, and (ii) creating an object file including the header and the respective driver, where the object file is in the executable format. The method also includes storing one or more of the object files in non-volatile memory.

According to some embodiments, a system for updating firmware includes a memory that is coupled to a computing device and stores a bundle of drivers in an executable format. The system also includes firmware that is coupled to the memory and stores the bundle of drivers. The system further includes a pre-boot application that determines, based on a memory map of the memory, a set of memory regions in the memory storing one or more drivers. For one or more drivers, the pre-boot application (i) builds, based on the memory map, a header that describes the respective driver, and (ii) creates an object file including the header and the respective driver, where the object file is in the executable format.

According to some embodiments, a machine-readable medium includes a plurality of machine-readable instructions that when executed by one or more processors is adapted to cause the one or more processors to perform a method comprising: receiving a memory map of a memory, the memory being coupled to a computing device and storing a bundle of drivers; determining, based on the memory map, a set of memory regions storing a bundle of drivers in the memory, the bundle of drivers residing in firmware and being in an executable format; for one or more drivers in the bundle of drivers: (i) building, based on the memory map, a header that describes the respective driver; and (ii) creating an object file including the header and the respective driver, the object file being in the executable format; and storing one or more of the object files in non-volatile memory.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
   A. Files in an Intermediate Compiling Format
   B. Load Drivers into Memory
III. Write Individual Drivers to a Storage Device
   A. Identify Memory Regions that Store Drivers
   B. Rebuild a File Including a Driver and its Corresponding Header
   C. Update Firmware
     1. Link the Rebuilt Files
     2. Flash the New Firmware Image onto Firmware
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

If a firmware vendor has a particular feature that another firmware vendor does not have and both firmware vendors provide the same type of firmware (e.g., both are using UEFI), it may be desirable to provide the particular feature in the other firmware vendor's product. The present disclosure provides techniques to use the particular feature on another piece of hardware entirely and to port it to another hardware platform. The target hardware platform without the particular feature may have the protocols to implement the particular feature but may not have the application linked in that performs the function of that particular feature. An advantage of an embodiment may be that it may be unnecessary for the user to be knowledgeable about the source or target hardware platform because the binary code residing in the firmware from the source can be relinked and run on the target hardware platform without much work for the user, as will be discussed further below.

Unless specifically stated otherwise, as apparent from the following discussion, it is appreciated that throughout the description, discussions using terms such as "receiving," "creating," "determining," "building," "creating," "storing," "identifying," "sending," "compiling," "linking," "flashing," "loading," "iterating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example System Architecture

Figure 1:
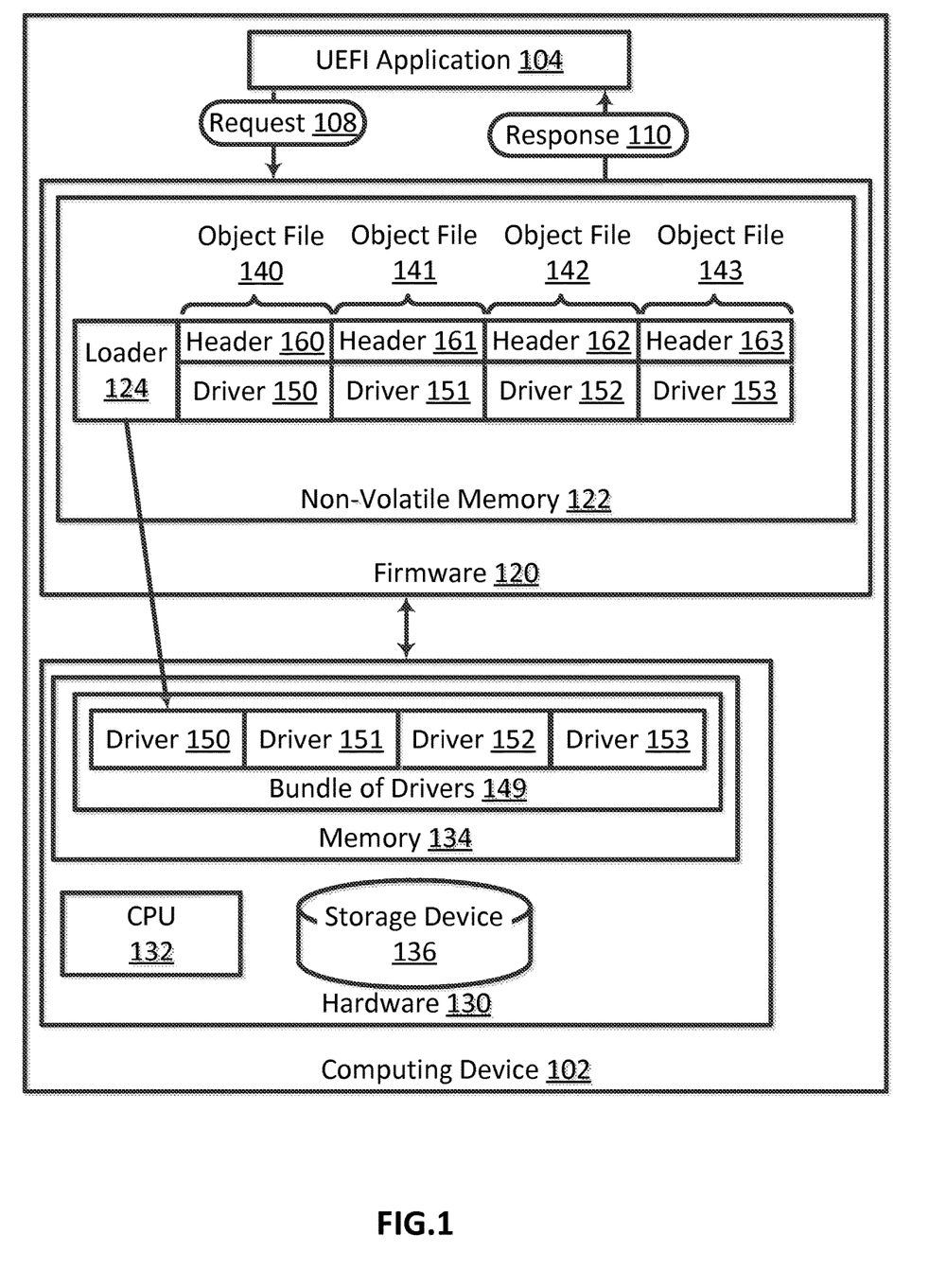
FIG. 1 is a block diagram illustrating a system for updating firmware, in accordance with some embodiments.

FIG. 1 is a block diagram illustrating a system 100 for updating firmware, in accordance with some embodiments. System 100 includes a computing device 102 including a Unified Extensible Firmware Interface (UEFI) application 104, firmware 120, and hardware 130. Computing device 102 may be, for example, a personal computer (PC), workstation, mobile device (e.g., a mobile phone, personal digital assistant (PDA), tablet, and laptop), game console, set-top box, kiosk, embedded system, or other device having at least one processor and memory. Additionally, computing device 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

Firmware 120 provides a standard environment for booting an operating system and running pre-boot applications. Firmware 120 provides an interface between platform firmware and pre-boot applications (and the operating system) executable on computing device 102. The interface includes data tables that contain platform-related information, boot service, calls, and runtime service calls that are available to the appropriate pre-boot applications and/or to the operating system and its loader.

In the example illustrated in FIG. 1, firmware 120 may be UEFI. UEFI application 104 is executable on computing device 102 and is executed before the operating system takes control of computing device 102. UEFI application 104 complies with the descriptions laid out in UEFI and may invoke the services of firmware 120. In an example, UEFI application 104 may send a request 108 to firmware 120 and receive a response 110 from firmware 120, where response 110 is responsive to request 108. UEFI application 104 may be a UEFI shell, shell command, flash utility, firmware driver, and/or diagnostic utility. Additionally, UEFI application 104 may reside inside firmware 120 shipped in computing device 102 or may be located or installed on a storage device. It should be understood that although UEFI is illustrated, computing device 102 may use any type of model defining an interface that is an intermediary between the pre-boot applications and the firmware.

A. Files in an Intermediate Compiling Format

Hardware 130 includes a central processing unit (CPU) 132, memory 134, and storage device 136. CPU 132 may execute one or more instructions stored in memory 134. Storage device 136 may be a persistent storage. Firmware 120 includes non-volatile memory 122 that stores a loader 124 and object files 140-143. Non-volatile memory 122 may also be referred to as flash memory that is persistent and stores data across reboots. Loader 124 and object files 140-143 may be part of the same physical flash memory and may be organized as an array of modules.

Object files 140-143 may be a compiled binary program including drivers and headers built from the original source code. A driver includes a code section, which is executable, and a data section, which is non-executable. The driver may be a binary executable that is stored in an object file. A header may store information about the memory size of the code and data sections of the corresponding driver, and may provide information on how to load the driver into memory. In the example illustrated in FIG. 1, object file 140 includes a driver 150 and a header 160 that describes driver 150, object file 141 includes a driver 151 and a header 161 that describes driver 151, object file 142 includes a driver 152 and a header 162 that describes driver 152, and object file 143 includes a driver 153 and a header 163 that describes driver 153. In an example, drivers 150-153 are UEFI drivers that are UEFI compliant binary programs that follow the UEFI specification driver model.

Object files 140-143 may be a binary blob including drivers that are in a format that is not easy for a user to understand and/or separate out into individual drivers. Loader 124 and object files 140-143 may be in a well-defined format such as portable executable (PE) format. When firmware 120 is built or the object file including the driver and header resides in non-volatile memory 122, the file may be in the PE format, which is effectively an intermediate compiling format that is executable. Additionally, the format may be processor agnostic. Although the PE format may be described in the present disclosure, it should be understood that the file may be in any format that is an intermediate compiling format.

B. Load Drivers into Memory

When computing device 102 starts up, loader 124 iterates through the object files and loads each of the drivers one-by-one into memory 134. Each driver may have a globally unique identifier (GUID) that uniquely identifies the driver. A GUID may be a randomly generated text string (e.g., 128-bit text string). To determine how much memory to allocate for a driver in memory 134, loader 124 reads the header that describes and corresponds to the driver in the object file. A field in the header may inform loader 124 how much memory should be set aside for mapping the executable into memory. For example, header 160 may specify the memory size of the code and data sections of driver 150 to be N megabytes (MBs) and M MBs, respectively, and loader 124 may allocate that much memory space (e.g., N+M MBs) in memory 134 to store driver 150. Loader 124 may load a driver into memory by mapping certain ranges of the file including the driver into the address space.

If the object file is a PE file, any information (e.g., code and data sections of a driver) that can be identified in the PE file can be identified when the file is loaded into memory 134. Loader 124 may look at the PE file and determine which portions of the file to map into memory 134. The mapping may be consistent such that higher offsets in the PE file correspond to higher memory addresses when mapped into memory 134. Additionally, loader 124 may read sections of the PE file and decide not to map one or more of the sections into memory 134. For example, for each object file, loader 124 may load the driver included in the object file into memory 134 without also loading the header that describes that driver. In the example illustrated in FIG. 1, loader 124 loads a bundle of drivers 149, which includes drivers 150-153, into memory 134 but does not load their corresponding headers (e.g., headers 160-163).

When loader 124 initializes a driver and loads it into memory 134, the driver may register itself with a system table that is compliant with firmware 120. In an example, the firmware is compliant with UEFI, and the system table is the UEFI system table. Loader 124 may expose one or more functions to the drivers. In an example, loader 124 exposes an install protocol function to the drivers. In this example, when a driver calls into the install protocol function exposed by loader 124, the driver may be added to a driver registry that allows other objects to look up the driver by a well-defined name (e.g., driver's GUID) and call methods exposed by the driver.

For each driver in bundle of drivers 149, UEFI provides an internal structure that enables a memory region storing the respective driver to be located and identified in memory 134. The drivers bundled in bundle of drivers 149 are effectively individual applications that are placed into bundle of drivers 149 as one unit, and may be individually identified. The present disclosure provides techniques to incorporate extant drivers from previous builds (rather than building full firmware images from another source tree and copied in place) and may provide the ability to use code extracted from an extant firmware image rather than code that is built from another source tree, to create firmware images.

The format of object files 140-143 may allow the data structures stored in firmware 120 to be the same as the data structures used and stored in memory 134. In an example, drivers 150-153 in bundle of drivers 149 stored in memory 134 are in the same format as they were in before they were loaded into memory 134 (in non-volatile memory 122).

III. Write Individual Drivers to a Storage Device

A. Identify Memory Regions that Store Drivers

Figure 2:
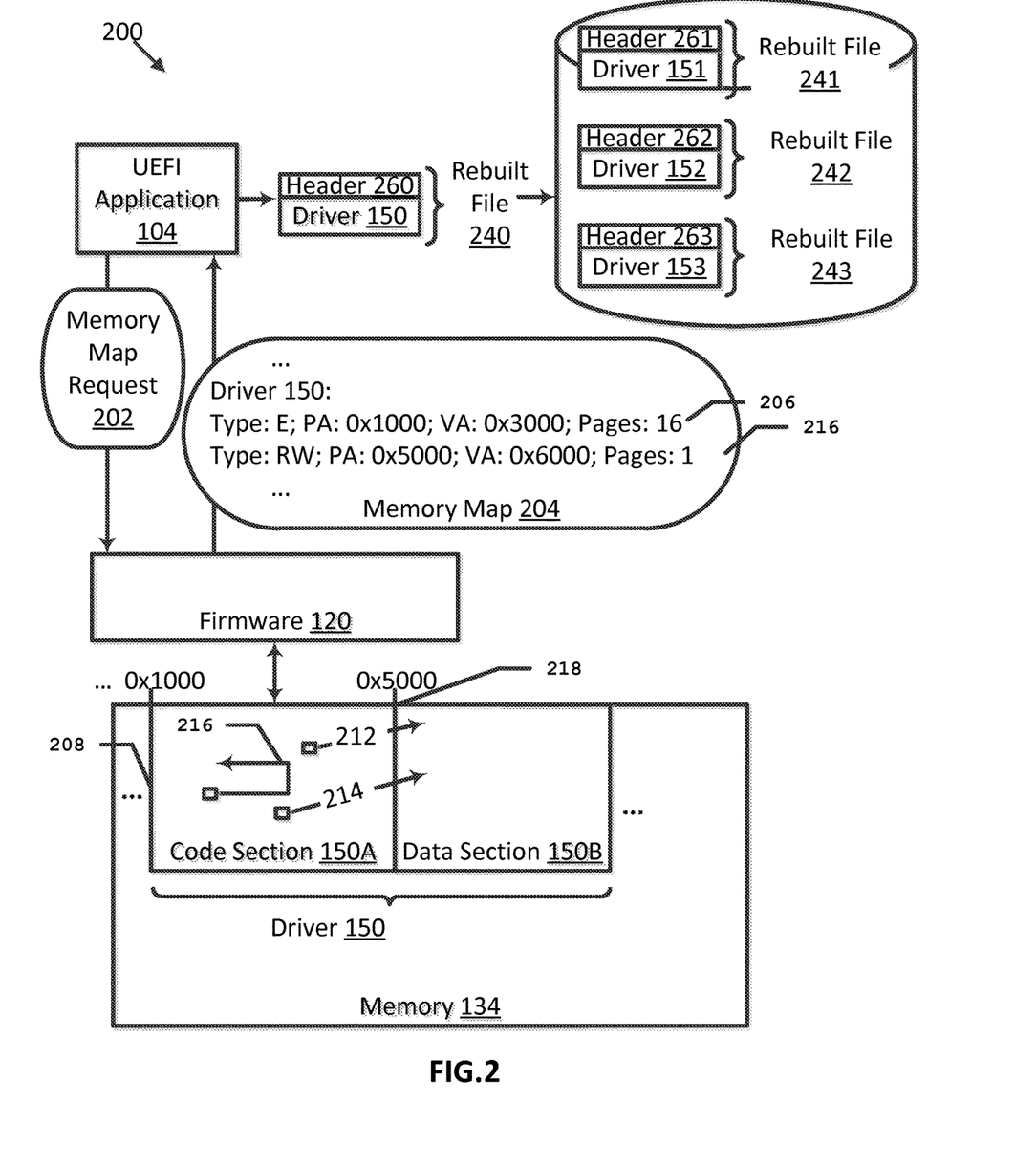
FIG. 2 is a block diagram illustrating a process flow for writing individual files including drivers to a storage device, in accordance with some embodiments.

FIG. 2 is a block diagram illustrating a process flow 200 for writing individual files including drivers to a storage device, in accordance with some embodiments. The following is a description of object file 140 and driver 150. This description applies as well to other object files in firmware 120 and other drivers that are loaded into memory 134. In FIG. 2, driver 150 includes code section 150A, which is executable code, and data section 150B, which is non-executable code. Loader 124 may store code section 150A of driver 150 at memory location "0x1000" in memory 134 and store data section 150B of driver 150 at memory location "0x5000" in memory 134. Code section 150A and data section 150B may or may not be stored at adjacent memory locations.

UEFI application 104 may interact with firmware 120 and determine a set of memory regions in memory 134, where the set of memory regions stores one or more drivers included in bundle of drivers 149. The driver may be in a format that is executable and/or processor agnostic. To identify the set of memory regions that stores the drivers, UEFI application 104 may request the current memory map of computing device 102 in order to determine what is stored where in memory 134. In FIG. 2, UEFI application 104 sends a memory map request 202 requesting the current memory map of computing device 102. In an example, firmware 120 exposes a Getmemorymap( ) function in a class of methods called "BootServices" in loader 124, and memory map request 202 causes the Getmemorymap( ) function to be invoked at firmware 120. In response to memory map request 202, firmware 120 may invoke the Getmemorymap( ) function, obtain a memory map 204 of memory 134, and send memory map 204 to UEFI application 104. In an example, memory map 204 is a memory map of memory 134 before the boot process is completed (e.g., before ExitBootServices( ) is called) and includes a list of the system memory and the content that is stored in memory 134.

When the boot phase is finished and loader 124 hands off control to the operating system, a function call to ExitBootServices( ) occurs and may free some of the memory that was originally used by firmware 120. Additionally, upon exit, UEFI application 104 may be unloaded from memory 134. Until ExitBootServices( ) is called, memory map 204 is owned by firmware 120. Accordingly, it may be desirable for UEFI application 104 to send memory map request 202 to firmware 120 before the operating system takes over control of computing device 102 to ensure that the returned memory map captures the memory used by firmware 120 before a portion of the firmware's memory is freed.

Memory map 204 may describe all of memory 134, no matter how it is being used. In an example, memory map 204 is an array of memory descriptors, each of which describes a contiguous block of memory. A block of memory may be memory that firmware 120 is using for its own purposes. A memory descriptor may include a type of memory region (e.g., read, write, or executable), a physical address of the first byte in the memory region, a virtual address of the first byte in the memory region, a number of pages (e.g., 4 KB) in the memory region, and any attributes of the memory region. An attribute may indicate, for example, particular data that is only used for boot services, executable firmware code that is only used for boot services, executable firmware code that is persistent after the operating system is loaded, and data that is persistent after the operating system is loaded. Other types are within the scope of the present disclosure.

Memory 134 is used by firmware 120 and stores the code and data section of one or more drivers included in bundle of drivers 149. Memory map 204 may have an entry for each the code and data sections of drivers 151-153 stored in memory 134. In the example illustrated in FIG. 2, in memory map 204, a memory descriptor 206 corresponds to a memory region 208 in memory 134. Memory descriptor 206 specifies that memory region 208 is of an executable type (e.g., code section 150A), "0x1000" is the physical address of the first byte in memory region 208, "0x3000" is the virtual address of the first byte in memory region 208, and memory region 208 is 16 pages. Similarly, in memory map 204, a memory descriptor 216 corresponds to a memory region 218. Memory descriptor 216 specifies that memory region 218 is of a read-write type (e.g., data section 150B), "0x5000" is the physical address of the first byte in memory region 218, "0x6000" is the virtual address of the first byte in memory region 218, and memory region 218 is 1 page.

UEFI application 104 iterates memory map 204 and identifies those memory regions that are used by firmware 120. UEFI application 104 may identify the code section of a driver by identifying executable types in memory map 204. UEFI application 104 may iterate across the code section of each driver and identify the data section that matches the driver's code section. A code section matches a data section if the code and data sections belong to the same driver. To identify the matching data section, UEFI application 104 may disassemble the code section by examining the binary code of the driver on an instruction-by-instruction basis and identifying references to memory.

For example, UEFI application 104 may read memory descriptor 206 and determine that memory region 208 starting at the physical address "0x1000" is used by firmware 120 and stores executable code. UEFI application 104 may determine that the executable code is a code section of a driver and knows from memory map 204 that the memory region is 16 pages. A page may be, for example, 4 KB or more. In some embodiments, UEFI application 104 disassembles the code section by examining the binary code of the driver on an instruction-by-instruction basis and identifying references to memory. A driver's code section, which is marked as executable in memory map 204, may have one or more pointer references to its own executable code section and/or to its matching data section. The references in a code section of a driver may reference the same section (e.g., the driver's code section) or the data section of the driver (e.g., references to memory that the code section has dynamically allocated) because the driver was built with these sections.

In FIG. 2, code section 150A is marked as an executable section in memory map 204 and includes references 212 and 214, which reference data in data section 150B, and also includes reference 216, which references code in code section 150A. UEFI application 104 may determine, based on memory map 204, the memory addresses at which the memory regions referenced by references 212, 214, and 216 are located in memory 134 and accordingly identify the memory regions of the code and data sections of the driver stored in memory 134.

UEFI application 104 may identify references within code section 150A to identify the memory region that stores the code section's matching data section, which is data section 150B. Memory map 204 may indicate that the memory region referenced by reference 212 references a memory address in memory region 218, which stores non-executable code, starts at the physical address "0x5000," includes the data referenced by references 212 and 214, and is 1 page. UEFI application 104 may determine that memory region 218 stores data section 150B that matches code section 150A. In this way, UEFI application 104 may search memory 134 for objects associated with a driver and may perform these actions for each driver stored in memory 134.

The references in the code section of a driver may also reference a UEFI system table. For example, one or more references in the code section of a driver may reference one or more of the functions listed in a UEFI system table, where the functions may be identified because their memory addresses are well-known to UEFI application 104. In an example, the UEFI system table includes functions RegisterAPI( ), RegisterProtocol( ), UnregisterAPI( ), Function1( ), and GetProtocol( ). RegisterAPI( ) is an entry point for each driver, and each code section of a driver may have the same entry point and point to the memory address at which this function is stored. The UEFI system table may include fewer than, more than, or different functions and/or protocols from that listed in the disclosure.

Driver 150 may be provided with a pointer to the UEFI system table that stores function calls. The UEFI system table includes one or more functions and/or one or more protocols that can be used for different purposes. In an example, a function stored in the UEFI system table may be a boot loader, a driver, etc. In an example, driver 150 is identified by the GUID "150" and registers its GUID with a driver registry when loader 124 initializes the driver. Referring back to FIG. 1, UEFI application 104 may include GUID "150" in request 108 to firmware 120 in order to request the driver associated with that GUID. For example, UEFI application 104 may send a request to firmware 120 to determine whether it has a particular protocol. If firmware 120 has the protocol, firmware 120 may send a response 110 back to UEFI application 104, where response 110 includes driver 150's pointer to the UEFI system table and UEFI application 104 may then be able to invoke the function calls in driver 150. Response 110 may include the memory address that stores the requested protocol.

Upon load, a driver may remain resident in memory 134 and install protocols or services that also remain resident in memory 134. Although four drivers are illustrated as being loaded into memory 134, it should be understood that fewer than four or more than four drivers may be loaded into memory 134 by loader 124.

B. Rebuild a File Including a Driver and its Corresponding Header

After UEFI application 104 identifies driver 150 (e.g., code and data sections of the driver), UEFI application 104 may rebuild a header 260 that describes the driver, write the driver and its corresponding header 260 to an individual file, and store the individual file in a storage device 236, as illustrated in FIG. 2. Driver 150, which is stored in memory 134, is the same binary executable that is stored in storage device 236. The file that is rebuilt by UEFI application 104 may be referred to as a rebuilt file and is in the same format as the original object files in firmware 120. For example, a rebuilt file 240 includes driver 150 and header 260 and may be stored in storage device 236. UEFI application 104 may rebuild the header based on the information in memory map 204. For example, UEFI application 104 may read memory descriptor 206 in memory map 204 and determine that code section 150A of driver 150 is 16 pages, the memory offset of code section 150A, etc., and include this information in header 260.

Using driver 150 as an example, UEFI application 104 may identify the driver that is stored in memory regions 208 and 218 and determine the size of the driver. For example, UEFI application 104 may determine that driver 150 will consume 17 pages (16 pages+1 page=17 pages). UEFI application 104 knows the size of driver 150 and its relative offsets and can rebuild a header that describes driver 150 from the information in memory map 204. In an example, rebuilt file 240 is a PE file that includes header 260 and driver 150.

UEFI application 104 may perform these actions to create a rebuilt file for each of the drivers in bundle of drivers 149 stored in memory 134. Storage device 226 includes rebuilt files 241-243, where rebuilt file 241 includes driver 151 and its rebuilt header 261, rebuilt file 242 includes driver 152 and its rebuilt header 262, and rebuilt file 243 includes driver 153 and its rebuilt header 263. In an example, UEFI application 104 writes each driver stored in memory 134 to storage device 236 individually and then post-processes the rebuilt files into binaries. In another example, UEFI application 104 writes the binaries out to storage device 236 by writing out all the memory regions that are marked as executable (e.g., code section of a driver) and the matching non-executable memory region (e.g., data section of a driver) into an individual file (a rebuilt file) and inserting the corresponding header into the file. The rebuilt file may be in the intermediate compiling format (e.g., PE format). Storage device 236 may be the same as or different from storage device 136. Additionally, storage device 236 may be coupled to computing device 102 over a network.

C. Update Firmware

A rebuilt file (e.g., rebuilt file 240) including a driver and a rebuilt header written to storage device 236 may be the same as the original object file (e.g., object file 140) built from the original source code. The rebuilt file, which is in the intermediate compiling format, may be compiled and then linked with one or more other rebuilt files. As such, the user may mix and match drivers by compiling and linking together the rebuilt files including those desired drivers, and may build software as though she had the original source code and update firmware using the rebuilt files. One of more rebuilt files may be linked together to produce a firmware image that can be flashed onto hardware or firmware again. In an example, a driver included in a rebuilt file may be added to firmware 120. In this example, the driver may be added to replace a driver in the firmware.

When UEFI application 104 writes rebuilt files 240-243 to storage disk 236, UEFI application 104 writes them out into individual files such that each file stores a driver and its corresponding header. Object files 240-243, which reside in firmware 120, may be considered a binary blob object that stores drivers and headers. UEFI application 104 may take the binary blob object apart and separate it into individual files (e.g., rebuilt files 240, 241, 242, and 243) that are written to storage device 236. Accordingly, each of the rebuilt files written to storage device 236 by UEFI application 104 may include an individual driver and its corresponding header. Although a rebuilt file is described as including one driver and its corresponding header, it should also be understood that UEFI application 104 may write more than one driver and its corresponding header to a rebuilt file.

1. Link the Rebuilt Files

Figure 3:
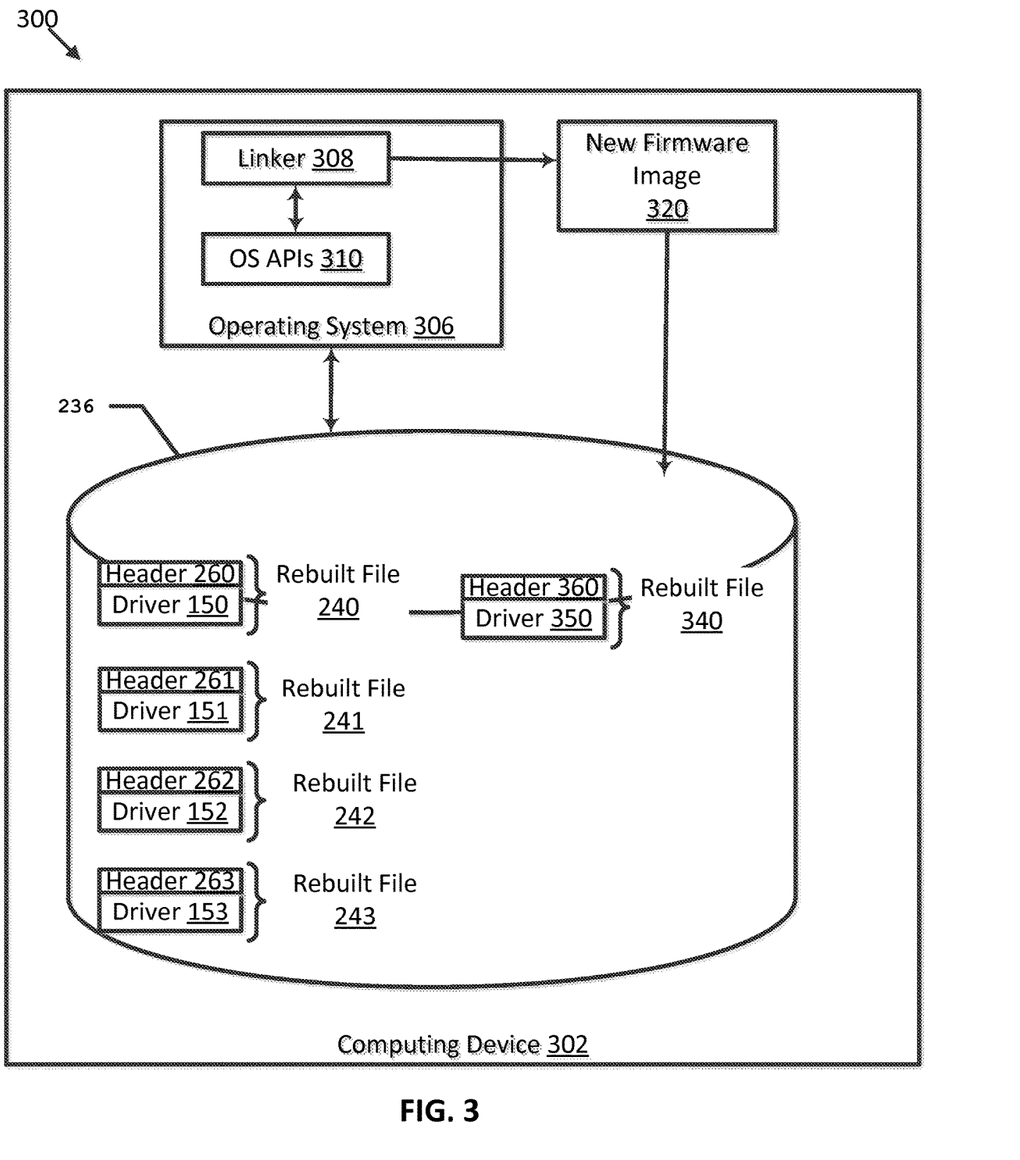
FIG. 3 is a block diagram illustrating the creation of a new firmware image, in accordance with some embodiments.

FIG. 3 is a block diagram illustrating the creation of a new firmware image 320, in accordance with some embodiments. FIG. 3 includes a computing device 302 including an operating system 306 that communicates with storage disk 236, which stores rebuilt files 240-243 and a rebuilt file 340. Each of rebuilt files 240-243 and 340 includes a driver and a header that describes the driver. Rebuilt file 340 includes a driver 350 and a header 360 that describes driver 350. Rebuilt file 340 may have been included in an object file residing in firmware 120 or firmware different from firmware 120 and written to storage disk 236, as discussed above. Operating system 306 includes a linker 308 and operating system application programming interfaces (APIs) 310. Linker 308 may communicate with the rebuilt files stored in storage device 236 via OS APIs 310. Computing device 302 may be the same machine as or a different machine from computing device 102.

A user (e.g., engineer) may mix and match a rebuilt file with one or more other rebuilt files (e.g., rebuilt file 240, 241, 242, 243, and 340) to produce a new combination of drivers for a loader to load into memory. In an example, the user may receive a request to replace driver 150 in firmware 120 with driver 350. Driver 350 may be a newer version of driver 150 and include features not included in driver 150 or may fix software bugs present in driver 150. In this example, the user may receive a request to replace driver 150 with driver 350 in firmware 120 from an end user or from company management.

The user may proceed to take actions to build a firmware image including driver 350. In an example, the user sends a request to computing device 302 to compile and link each driver to be included in the new firmware image, resulting in the creation of a PE file for each driver and the linkage of the PE files. The driver to be added (e.g., driver 350) and each of the drivers in firmware 120 except the driver to be replaced in the firmware (e.g., driver 150) may be compiled and linked together to produce the new firmware image. In the example illustrated in FIG. 3, linker 308 compiles drivers 151, 152, 153, and 350, links them together to generate new firmware image 320, and stores new firmware image 320 in storage device 236 for later retrieval.

2. Flash the New Firmware Image onto Firmware

Figure 4:
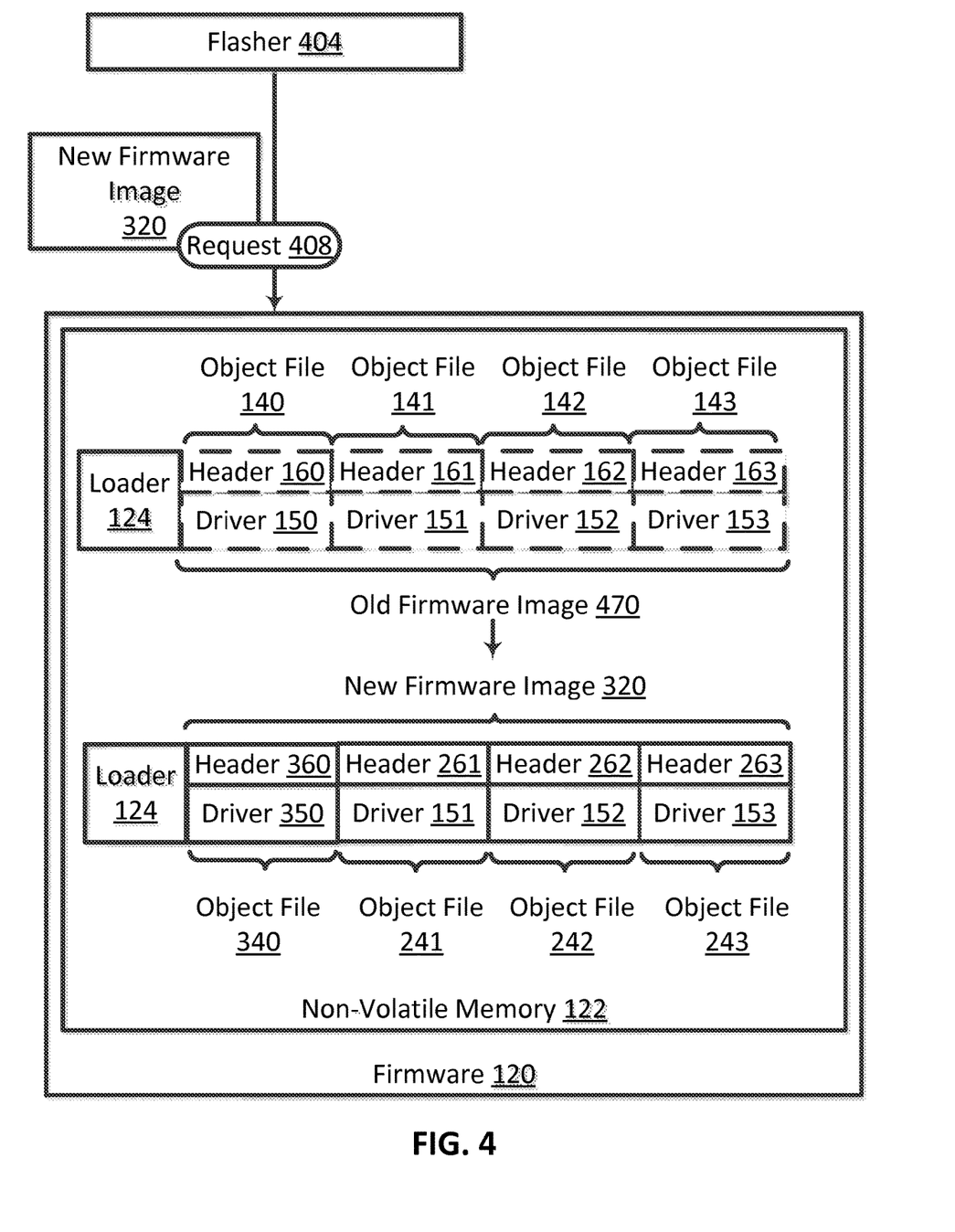
FIG. 4 is a block diagram illustrating the new firmware image being flashed onto firmware, in accordance with some embodiments.

New firmware image 320 may be flashed onto firmware, which may be included in computing device 102, computing device 302, or a different computing device. In an example, new firmware image 320 is flashed onto firmware 120. FIG. 4 is a block diagram illustrating the new firmware image being flashed onto firmware 120, in accordance with some embodiments. Firmware 120 may be included in computing device 102 or in a different computing device. In FIG. 4, a flasher 404 may send a request to the computing device coupled to firmware 120 to flash new firmware image 320 onto firmware 120. Flasher 404 may be, for example, a UEFI application, an operating system-based application, or a hardware tool that can be physically clipped onto a flash chip to drive the pins to flash new firmware image 320 onto firmware 120.

Before the firmware update and as indicated by the dashed lines in FIG. 4, firmware 120 may include an old firmware image 170 including object file 140 (driver 150 and header 160), object file 141 (driver 151 and header 161), object file 142 (driver 152 and header 162), and object file 143 (driver 153 and header 163). In this example, loader 124 loads the drivers 150-153 into memory. After new firmware image 320 is flashed onto firmware 120, new firmware image 320 replaces old firmware image 170, effectively replacing object files 140-143 with object files 340, 241, 242, and 243. Accordingly, the next time the computing device starts up, loader 124 will load drivers 350, 151, 152, and 153 included in new firmware image 320 into memory rather than drivers 150-153 included in old firmware image 170. An end user (e.g., customer) may then use driver 350 (or any of drivers 151-153) and enjoy the benefits of the upgrade.

It should be understood that driver 350 may be added to firmware 120 without replacing any of the drivers in the original firmware image (e.g., old firmware image 170). For example, object files 140-143 and 340 may be linked together to produce a new firmware image including drivers 150-153 and 350 and their corresponding headers 160-163 and 360.

As discussed above and further emphasized here, FIGS. 1-4 are merely examples, which should not unduly limit the scope of the claims.

IV. Example Method

Figure 5:
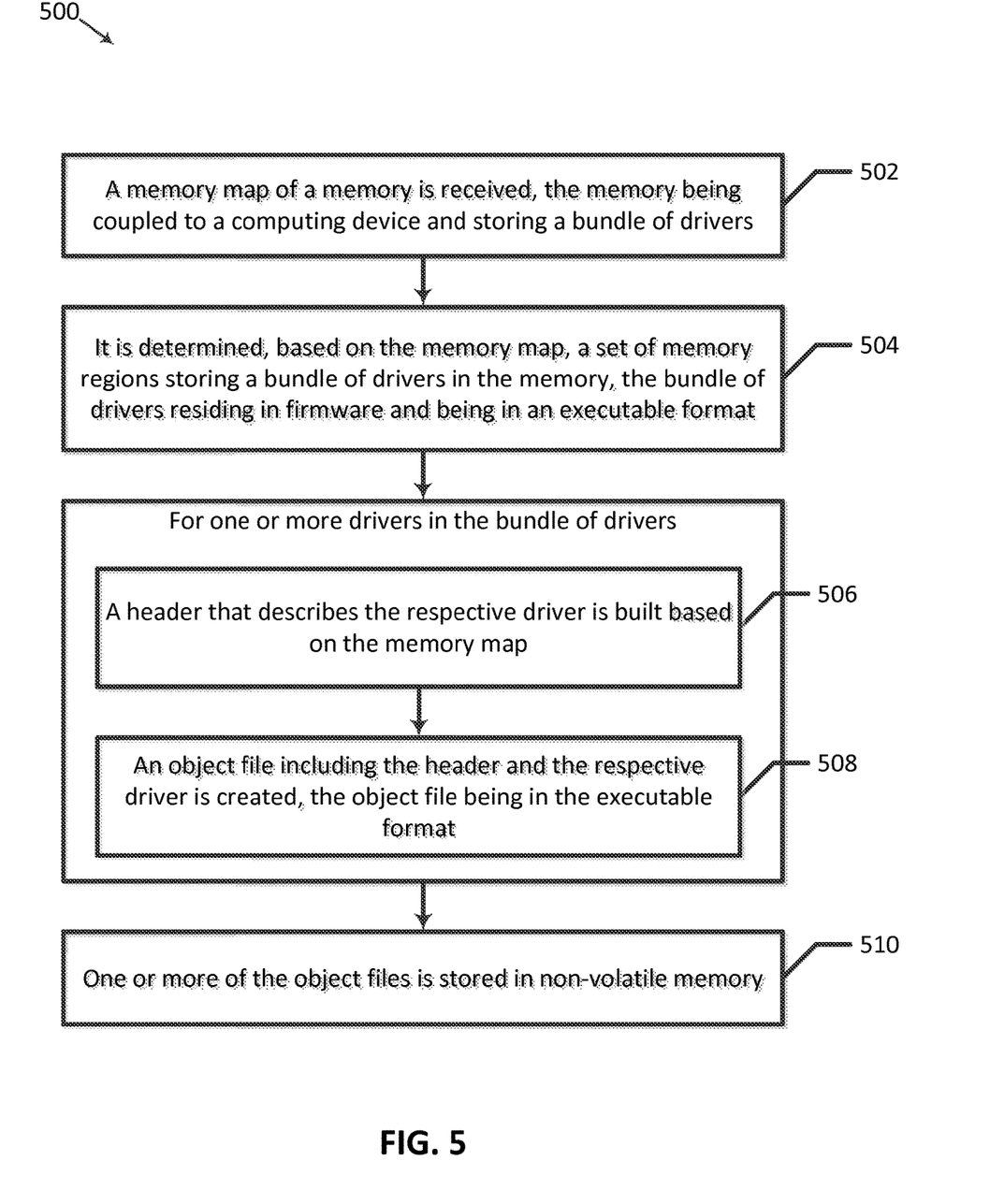
FIG. 5 is a flowchart illustrating a method of updating firmware, in accordance with some embodiments.

FIG. 5 is a flowchart illustrating a method 500 of updating firmware, in accordance with some embodiments. Method 500 is not meant to be limiting and may be used in other applications.

In FIG. 5, method 500 includes blocks 502-510. In a block 502, a memory map of a memory is received, the memory being coupled to a computing device and storing a bundle of drivers. In an example, UEFI application 104 receives memory map 204 of memory 134, which is coupled to computing device 102 and stores a bundle of drivers 149.

In a block 504, it is determined, based on the memory map, a set of memory regions storing a bundle of drivers in the memory, the bundle of drivers residing in firmware and being in an executable format. In an example, UEFI application 104 determines, based on memory map 204, memory regions 208 and 218 storing at least one driver in bundle of drivers 129 in memory 134, where bundle of drivers 129 resides in firmware 120 and is in an executable format.

For one or more drivers in the bundle of driver, instructions to perform the actions in blocks 506 and 508 may be executed. In block 506, a header that describes the respective driver is built based on the memory map. In an example, UEFI application 104 builds, based on memory map 204, header 260 that describes driver 150. In block 508, an object file including the header and the respective driver is created, the object file being in the executable format. In an example, UEFI application 104 creates object file 140 including header 160 and driver 150, object file 140 being in the executable format.

In a block 510, one or more of the object files is stored in non-volatile memory. In an example, UEFI application 104 stores one or more of the object files in storage disk 236.

In some embodiments, blocks 502-510 may be performed for any number of drivers stored in memory 134. It is also understood that additional processes may be inserted before, during, or after blocks 502-510 discussed above. It is also understood that one or more of the blocks of method 500 described herein may be omitted, combined, or performed in a different sequence as desired.

V. Example Computing System

Figure 6:
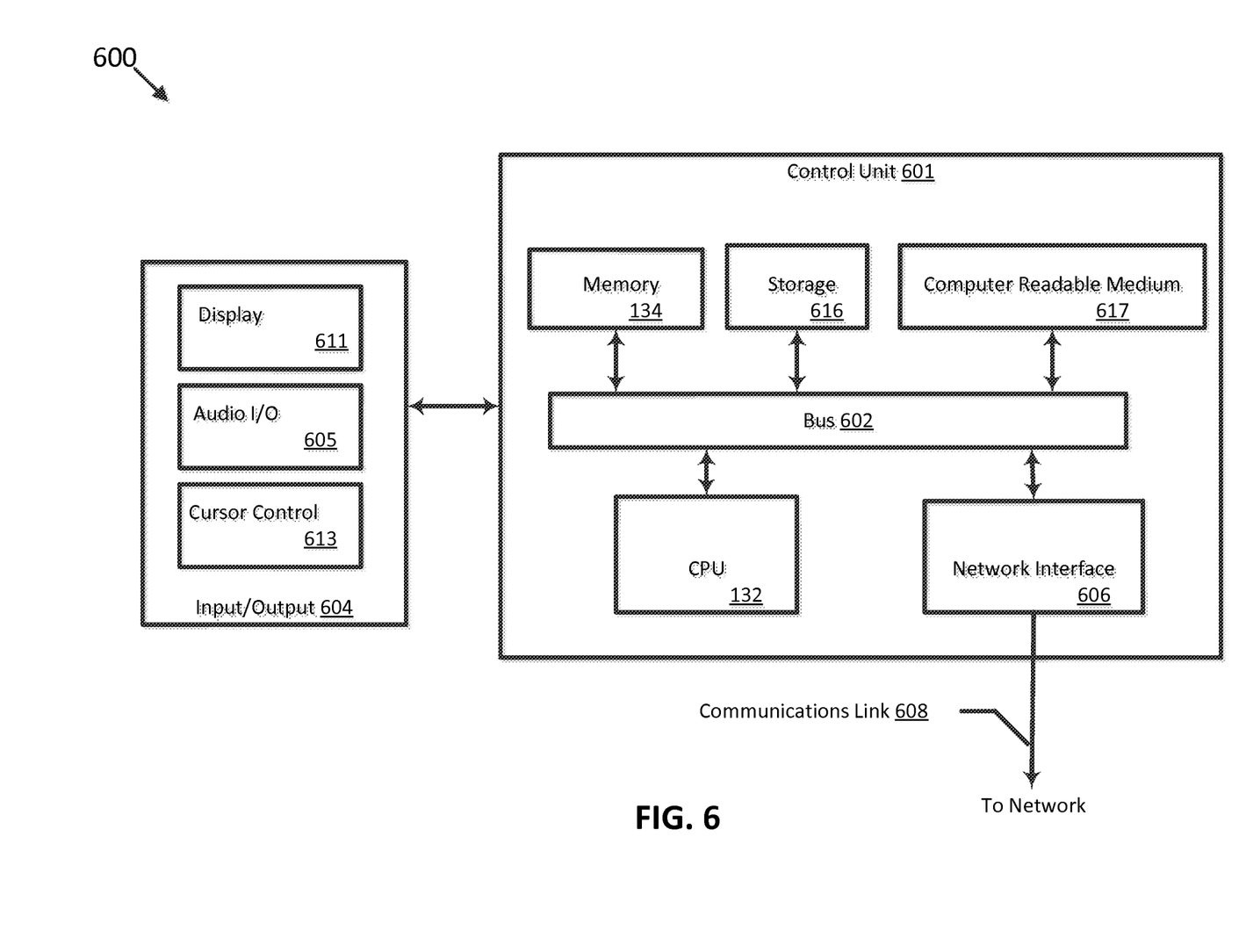
FIG. 6 is a block diagram of an electronic system suitable for implementing one or more embodiments of the present disclosure.

FIG. 6 is a block diagram of an example computer system 600 suitable for implementing any of the embodiments disclosed herein. In various implementations, UEFI application 104, firmware 120, or operating system 306 may be implemented on computer system 600. Computer system 600 may include one or more CPUs 132. Computer system 600 may additionally include one or more storage devices each selected from a group including floppy disk, flexible disk, hard disk, magnetic tape, any other magnetic medium, CD-ROM, any other optical medium, RAM, PROM, EPROM, FLASH, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 for processing user actions, such as selecting keys from a keypad/keyboard or selecting one or more buttons or links, etc., and sending a corresponding signal to bus 602. I/O component 604 may also include an output component such as a display 611, and an input control such as a cursor control 613 (such as a keyboard, keypad, mouse, etc.).

An audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 618 to a network. In an embodiment, the transmission is wireless, although other transmission mediums and methods may also be suitable.

CPU 132, which may be a micro-controller, digital signal processor (DSP), or other processing component, processes these various signals, such as for display on display 611 of computer system 600 or transmission to other devices via communication link 618. A processor may also control transmission of information, such as cookies or IP addresses, to other devices.

Components of computer system 600 also include a system memory component 614 (e.g., RAM), a static storage component 616 (e.g., ROM), and/or a computer readable medium 617. Computer system 600 performs specific operations by one or more CPUs 132 and other components by executing one or more sequences of instructions contained in system memory component 614. Logic may be encoded in computer readable medium 617, which may refer to any medium that participates in providing instructions to one or more CPUs 132 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 614, and transmission media include coaxial cables, copper wire, and fiber optics, including wires that include bus 602.

In an embodiment, the logic is encoded in non-transitory computer readable medium. Computer readable medium 617 may be any apparatus that can contain, store, communicate, propagate, or transport instructions that are used by or in connection with CPU 132. Computer readable medium 617 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of updating firmware, comprising:
receiving a memory map of a memory, the memory being coupled to a computing device and storing a bundle of drivers, the bundle of drivers residing in the firmware and being in an executable format, wherein the memory map includes a set of memory descriptors and captures the memory used by the firmware before the boot process is completed and before the memory is freed:
for one or more drivers of the bundle of drivers:
determining, based on a first memory descriptor of the set of memory descriptors, a first memory region storing a first executable code section of a respective driver, the first executable code section including a reference to a first data section of the respective driver;
determining, based on the reference to the first data section, a second memory region storing the first data section of the respective driver;
building a header that stores a first memory size of the first executable code section and stores a second memory size of the first data section; and
creating an object file including the header and the respective driver, the one or more drivers included in the object the being in the executable format;
storing one or more of the object files in a storage device;
sending a request for the memory map, wherein determining the first memory region includes iterating the memory map for a memory region being used by the firmware and marked as an executable type;
creating a new firmware image based the one or more object files stored in the storage device; and
storing the new firmware image in non-volatile memory;
wherein the creating a new firmware image includes compiling at least first and second object files stored in the storage device; and
linking the at least first and second compiled object files, wherein the new firmware image includes the linked object files.

2. The method of claim 1, wherein each driver of the bundle of drivers corresponds to a header that describes the respective driver, and each header corresponding to a driver of the bundle of drivers resides in the firmware.

3. The method of claim 1, further including:
flashing the new firmware image to second firmware.

4. The method of claim 3, wherein the second firmware stores an initial firmware image, and wherein the flashing includes replacing the initial firmware image with the new firmware image.

5. The method of claim 1, wherein the receiving a memory map includes receiving the memory map before a boot process associated with the computing device is completed.

6. The method of claim 1, wherein the firmware is separate from the memory.

7. A system for updating firmware, comprising:
a memory that is coupled to a computing device and stores a bundle of drivers in an executable format;
firmware that is coupled to the memory and stores the bundle of drivers in the executable format; and
a pre-boot application that receives a memory map of the memory, wherein the memory map includes a set of memory descriptors and captures the memory used by the firmware before the boot process is completed and before the memory is freed;
wherein for one or more drivers of the bundle of drivers, the pre-boot application determines, based on a first memory descriptor of the set of memory descriptors, a first memory region storing a first executable code section of a respective driver, determines, based on a reference from the first executable code section to the first data section, a second memory region storing a first data section of the respective driver, builds a header that stores a first memory size of the first executable code section and stores a second memory size of the first data section, and creates an object the including the header and the respective driver, the one or more drivers included in the object the being in the executable format, and wherein the pre-boot application stores one or more of the object files in a storage device;
sending a request for the memory map, wherein determining the first memory region includes iterating the memory map for a memory region being used by the firmware and marked as an executable type;
creating a new firmware image based the one or more object files in the storage device; and
storing the new firmware image in non-volatile memory;
wherein the creating a new firmware image includes compiling at least first and second object files stored in the storage device; and
linking the at least first and second compiled object files, wherein the new firmware image includes the linked object files.

8. The system of claim 7, further including:
a loader that loads the bundle of drivers residing in firmware into the memory.

9. The system of claim 8, wherein the computing device executes the pre-boot application and the loader.

10. The system of claim 9, further comprising:
a linker that is executable on a second computing device, wherein the linker compiles at least a first object the and a second object the stored in the storage device and links the at least first object file with the second object the file.

11. The system of claim 10, wherein the linker produces a new firmware image based on the at least first object the linked with the second object file and stores the new firmware image to second non-volatile memory.

12. The system of claim 11, wherein the storage device is different from the non-volatile memory.

13. The system of claim 11, wherein the storage device is the same as the non-volatile memory.

14. The system of claim 11, further comprising: a flasher that flashes the new firmware image to second firmware.

15. The system of claim 7, wherein each driver in the bundle of drivers is a Unified Extensible Firmware Interface (UEFI) driver.

16. The system of claim 7, wherein the object file is in an intermediate compiling format.

17. A non-transitory machine-readable medium comprising a plurality of machine-readable instructions that when executed by one or more processors is adapted to cause the one or more processors to perform a method comprising:
receiving a memory map of a memory, the memory being coupled to a computing device and storing a bundle of drivers, the bundle of drivers residing in the firmware and being in an executable format, wherein the memory map includes a set of memory descriptors and captures the memory used by the firmware before the boot process is completed and before the memory is freed:
for one or more drivers of the bundle of drivers:
determining, based on a first memory descriptor of the set of memory descriptors, a first memory region storing a first executable code section of a respective driver, the first executable code section including a reference to a first data section of the respective driver; building a header that stores a first memory size of the first executable code section and stores a second memory size of the first data section; and
creating an object file including the header and the respective driver, the one or more drivers included in the object file being in the executable format; and
storing one or more of the object files in a storage device;
sending a request for the memory map, wherein determining the first memory region includes iterating the memory map for a memory region being used by the firmware and marked as an executable type; and
storing the new firmware image in non-volatile memory;
wherein the creating a new firmware image includes compiling at least first and second object files stored in the storage device; and
linking the at least first and second compiled object hies, wherein the new firmware image includes the linked object files.

* * * * *